United States Patent [19]
Davison

[11] Patent Number: 5,406,997
[45] Date of Patent: Apr. 18, 1995

[54] MECHANICAL TREE DELIMBING DEVICE

[76] Inventor: Tim Davison, 4853 N. Sherman Rd., Deer Park, Wash. 99006

[21] Appl. No.: 236,181

[22] Filed: May 2, 1994

[51] Int. Cl.$^6$ .................... A01G 23/00; B27L 1/00
[52] U.S. Cl. ................................ 144/2 Z; 144/343
[58] Field of Search ................ 144/2 Z, 3 D, 343

[56] References Cited

U.S. PATENT DOCUMENTS

| | | | |
|---|---|---|---|
| 3,881,532 | 5/1975 | Jouppi | 144/2 Z |
| 4,034,785 | 7/1977 | Tucek | 144/2 Z |
| 4,124,047 | 11/1978 | Dressler et al. | 144/2 Z |
| 4,749,012 | 6/1988 | Hamby, Jr. | 144/343 |
| 4,899,794 | 2/1990 | Hamby, jr. | 144/343 |

*Primary Examiner*—W. Donald Bray
*Attorney, Agent, or Firm*—Harry M. Cross, Jr.

[57] ABSTRACT

A mechanical pull-through delimber for delimbing a felled tree comprises a delimber section having first and second trunk supports for receiving and supporting a portion of a tree trunk, and a delimber assembly mounted between the first and second trunk supports. The delimber assembly comprises delimber arms mounted to pivot inward to a tree trunk delimbing position and to pivot outward to a tree trunk loading position, and a delimber arm actuator. The delimber arm actuator connects the delimber arms with the second trunk support, so that the weight of a tree trunk supported by the second trunk support will cause the delimber arms to pivot inward to a tree trunk delimbing position.

14 Claims, 5 Drawing Sheets

MECHANICAL TREE DELIMBING DEVICE

BACKGROUND OF THE INVENTION

1. Field of the Invention

This invention relates to logging equipment and, more particularly, to devices for delimbing trees after the trees have been harvested.

2. Brief Description of the Prior Art

Tree delimbing, following the felling, or harvesting, of a tree historically has been done manually with the aid of a chain saw. For larger timber, and particularly for fir and spruce, when a tree is felled, the weight of the tree will cause many of the limbs to snap off the trunk; and the yarding or skidding of the felled tree to a landing would also cause more of the limbs to snap off under the weight of the tree. Consequently, when the felled tree reached the landing, the manual removal of the remaining limbs by means of a chain saw was convenient and, relatively-speaking, not too dangerous. For smaller timber, and particularly for pine—which tends to be bushy—when a tree is felled, the weight of the tree is not sufficient to cause many of the limbs to snap off the trunk; and the yarding or skidding of the felled tree to a landing would also not cause many of the limbs to snap off because of the relative lightness of the tree. Moreover, because such a smaller tree, or a tree that is particularly bushy such as pine, would arrive at the landing, essentially supported by its limbs, and with essentially all of its limbs intact, the task of manually removing the limbs by means of a chain saw would be much more hazardous and also would be much more time consuming and economically unproductive.

There has arisen, therefore, a class of devices known as "delimbers" which are designed to delimb a whole tree at the landing site, thereby either eliminating the requirement for manual delimbing by means of a chain saw or drastically reducing the time that a logger must spend in manual delimbing. In particular, where modern forestry practice is necessitating the removal of smaller trees to thin-out a forest, there is an even more growing need for delimbing devices that will delimb whole, felled trees by machine.

A popular type of delimbing device has come to be known as a pull-through delimber. A pull-through delimber is intended to be operated in conjunction with a grapple-type log loader. The delimber will be set near such a log loader so that the trunk of a tree to be delimbed can be grasped by the loader grapple and placed astride the delimber. The delimber will have some means to encircle the log with delimbing devices, and the delimbing devices will be caused to encircle the log placed therein by the grapple loader. The grapple loader, without letting loose of the log, will then strip the tree trunk through the delimber, and the delimber devices will strip the trunk of the tree's limbs. The grapple loader will then, again without releasing the tree trunk, position the stripped trunk alongside the loader and release it.

The pull-through delimbers available today have become so expensive that many logging operators cannot afford them. Moreover, many of these delimbers have become so complicated, by the addition of tree trunk-bucking and tree-topping equipment for example, as to have become even more expensive, and more susceptible to damage—and thus subject to expensive downtime—and more susceptible to jam-ups, and operator inefficiencies; hence more expensive to operate.

SUMMARY OF THE INVENTION

It is a primary object of this invention to provide the logging industry with a pull-through delimbing device that is less expensive and easier to operate. It is a further object of this invention to provide a pull-through delimbing device that is less complicated and simpler to operate. It is an additional object of this invention to provide delimbing apparatus that is operated mechanically without the application of hydraulics or electronics, that is to say without the incorporation of hydraulic or electronic actuating or control means.

In accordance with these objects, the invention comprises a mechanical pull-through delimber for delimbing a felled tree which comprises a delimber section providing a mounting means for a delimbing assembly. The delimber section is adapted to have a tree trunk loaded into the delimbing assembly and to support the tree trunk in a position whereby the tree trunk may be pulled through the delimbing assembly for delimbing. The delimbing assembly, being mounted by the delimber section, comprises a first trunk supporting means for receiving and supporting a portion of a tree trunk, second trunk supporting means for receiving and supporting a second portion of a tree trunk, and delimber means mounted between the first and second trunk supporting means for removing limbs from the tree trunk as the tree trunk is pulled through the delimbing assembly. The delimber means comprises first and second delimber arm means mounted to pivot inward to a tree trunk delimbing position and to pivot outward to a tree trunk loading position, and delimber arm actuating means. The first delimber arm means includes first delimber knife means for contacting and cutting limbs off a tree trunk when the first delimber arm means is positioned in the tree trunk delimbing position. The second delimber arm means includes second delimber knife means for contacting and cutting limbs off a tree trunk when the second delimber arm means is positioned in the tree trunk delimbing position. The delimber arm actuating means connects the first and second delimber arms with the second trunk supporting means, the delimber arm actuating means being so constructed and arranged such that the first and second delimber arm means are normally positioned outward to the tree trunk loading position, and such that the weight of a tree trunk supported by the second trunk supporting means will cause the first and second delimber arm means to pivot inward to the tree trunk delimbing position, whereby the first and second delimber knife means will be automatically positioned for cutting limbs off a tree trunk as a result of the tree trunk being loaded into the delimbing assembly.

DESCRIPTION OF THE PREFERRED EMBODIMENT

Figure 1:
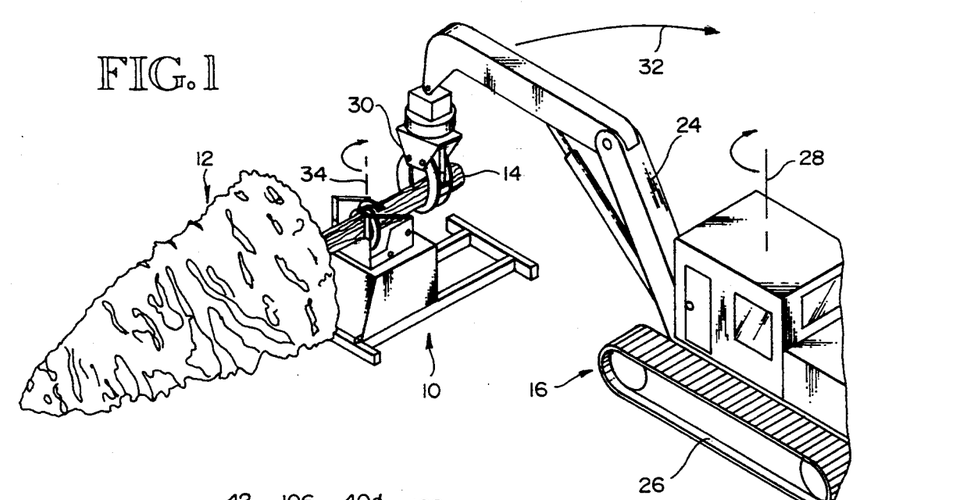
FIG. 1 is an overall view in perspective of a delimbing operation, showing the relative positions of a grapple log loader and the delimber device of this invention, the grapple loader having grasped a felled tree and positioned the tree in the delimber in preparation for delimbing to take place.

The present invention is a delimber 10 of the pull-through type. That is to say, the delimber operates on a tree 12 to delimb the tree trunk 14 as the tree trunk is pulled through the delimber by some external means such as a grapple log loader 16. The delimber 10 comprises a base section 18 and a delimber section 20. The delimber section 20 is mounted atop the base section 18 and connected thereto by means of a pivot pin 22 (see FIG. 10) so that the delimber section 20 may be horizontally-rotated around the vertical axis of pivot pin 22 relative to the stationary base section 18. When the delimber 10 is set alongside the loader 16, such as is shown in FIG. 1, the loader grapple boom 24—being mounted to an undercarriage 26 for rotation about the undercarriage vertical axis 28—will rotate to pick up the tree 12 by means of its grapple 30 and then swing around to load the tree into the delimber 10. When delimber 10 is set for delimbing, the boom 24 of the loader 16 will be operated to pull the tree through the delimber 10, from left to right as shown in FIG. 1. As the boom 24 is so operated, it will rotate around its axis 28 along a wide arc 32. This rotation will cause the longitudinal axis of the tree 12 to swivel slightly as the tree is pulled through the delimber 10. Consequently, for the delimber 10 to keep in alignment with the tree 12—and thereby avoid being jammed or damaged or causing the tree trunk to be damaged—the delimbing section 20 of delimber 10 must be allowed to rotated relative to the base section 18 about a vertical axis 34, which is the axis of pivot pin 22.

Figure 2:
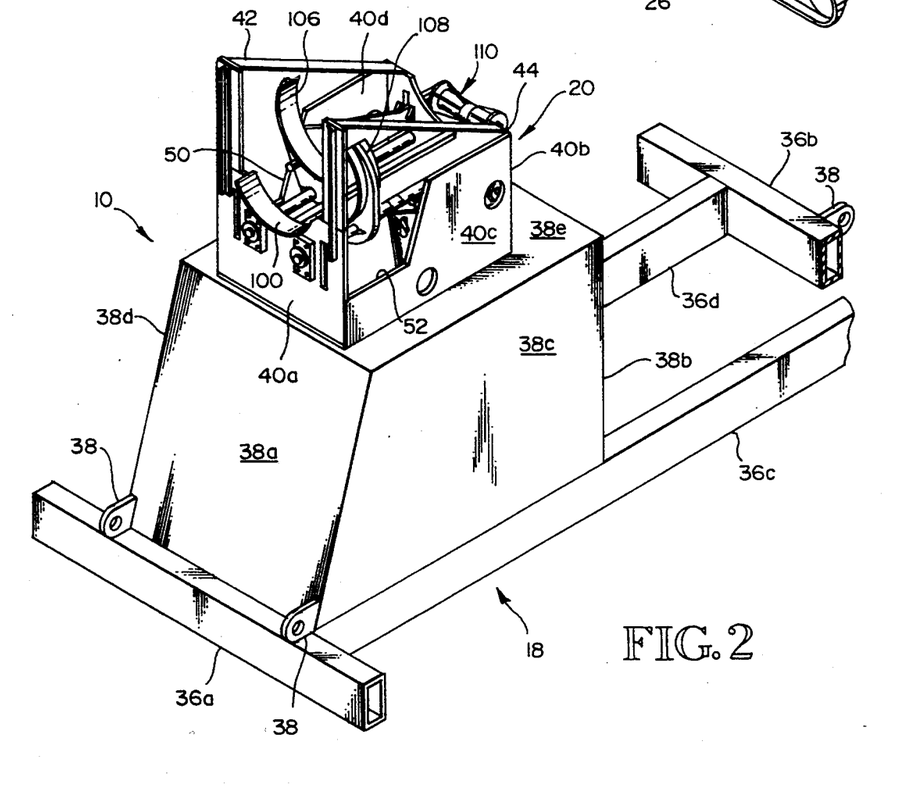
FIG. 2 is a view in perspective of the delimbing assembly of the delimber device of this invention.

The base section 18 is constructed so as to be solid and heavy enough that it will remain in position during the delimbing operation. As shown in FIGS. 1 and 2, the base section 18 comprises a rectangular frame fabricated by front, rear and side steel box beams 36a, 36b, 36c, and 36d. Lifting and positioning eyes 38 are appropriately located on the box beams, such as on the front and rear beams as shown in FIG. 2, so that the delimber 10 may be lifted and loaded for transport from site to site, or may be positioned or repositioned on site. A base box fabricated from front, rear, side and top steel plates 38a, 38b, 38c, 38d, and 38e, is rigidly attached to the box beam frame by suitable means such as steel bolts or weldments. The base box may also include a base plate (not shown) to which the front, rear and side plates are rigidly secured as by weldments. The plates that make up this base box are rigidly assembled together as by weldments. The side box beams 36c, 36d preferably extend rearward beyond the base box to provide front-to-rear stability to prevent the delimber 10 from being tipped or jacked-up, front-to-rear, during a delimbing operation. The end box beams 36a, 36b preferably extend sideways beyond the side beams 36c, 36d to provided side-to-side stability to prevent the delimber 10 from being tipped sideways during a delimbing operation.

Figure 3:
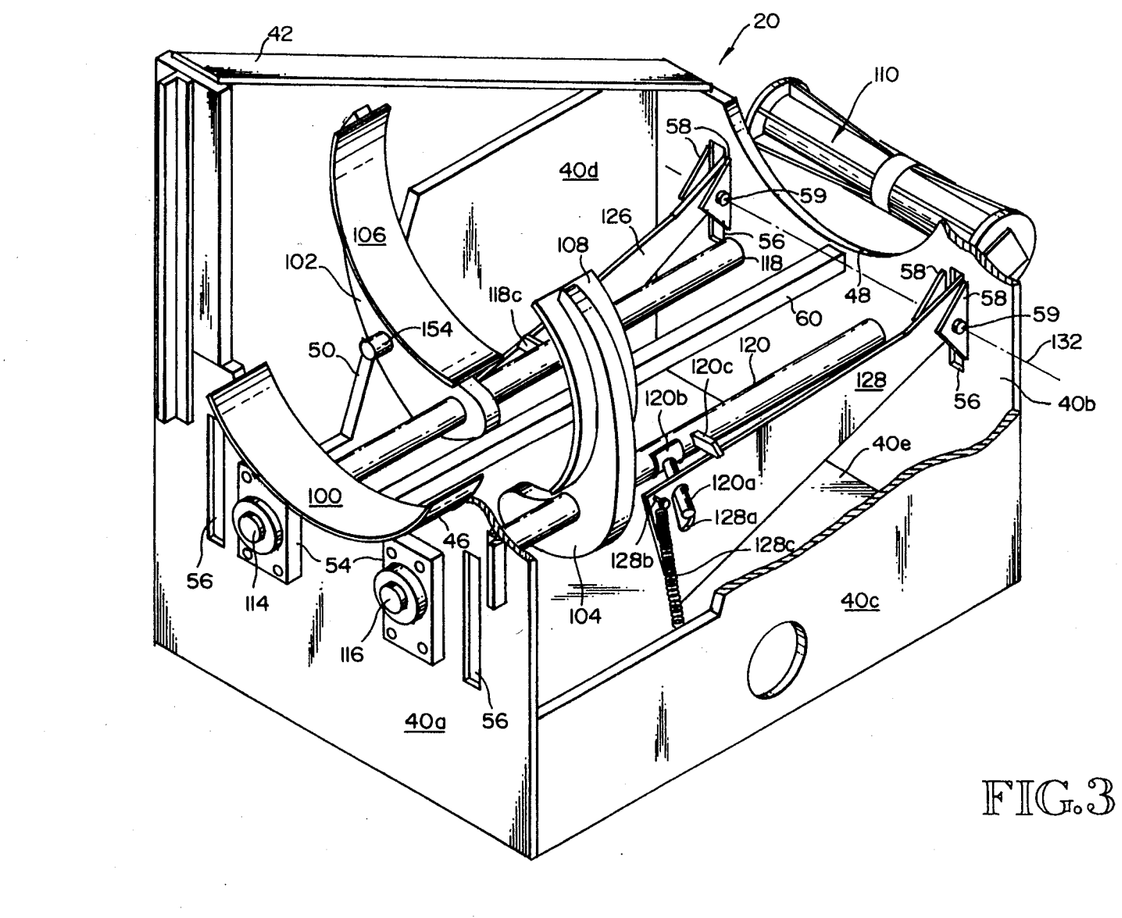
FIG. 3 is a view in perspective of the FIG. 2 delimber with a near side plate broken away to show the internal operating elements.
Figure 4:
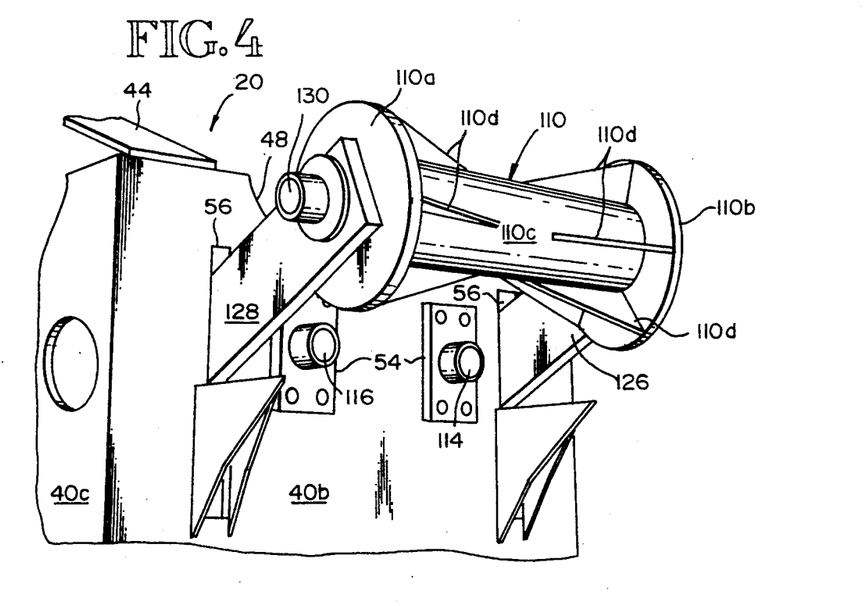
FIG. 4 is a partial view in perspective of the FIG. 3 delimbing assembly showing the exit, or rear, end of the assembly.
Figure 6:
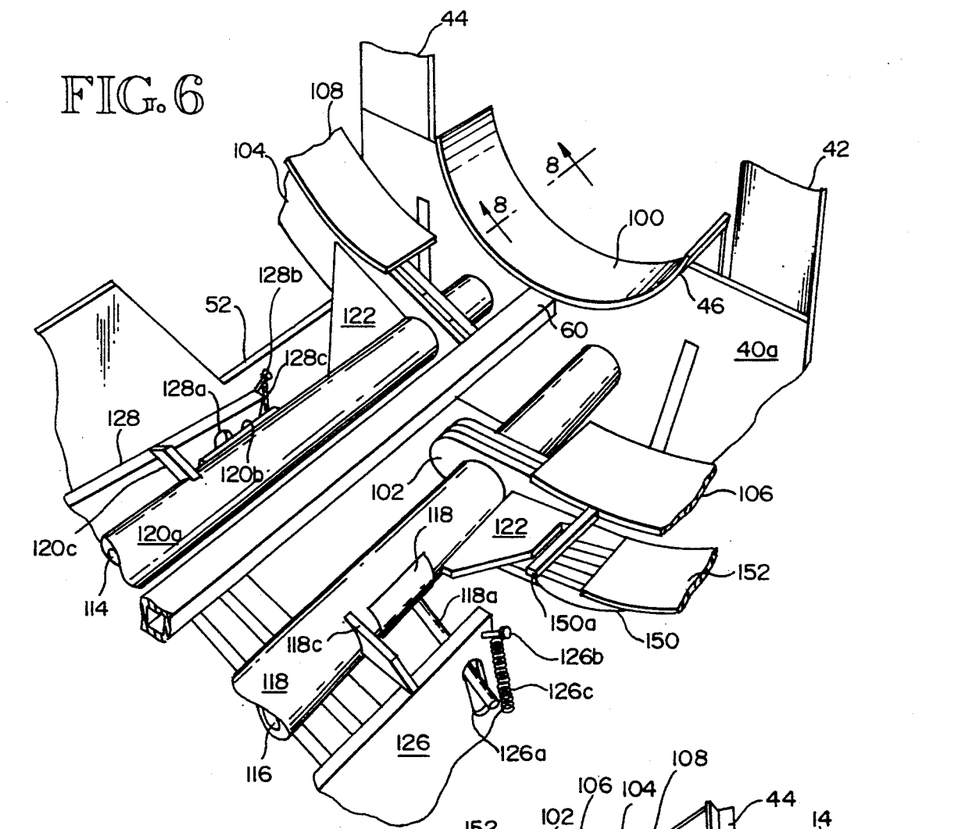
FIG. 6 is a partial view in perspective of the FIG. 3 internal operating elements of the delimbing assembly showing the entry, or front, end of the device.
Figure 7:
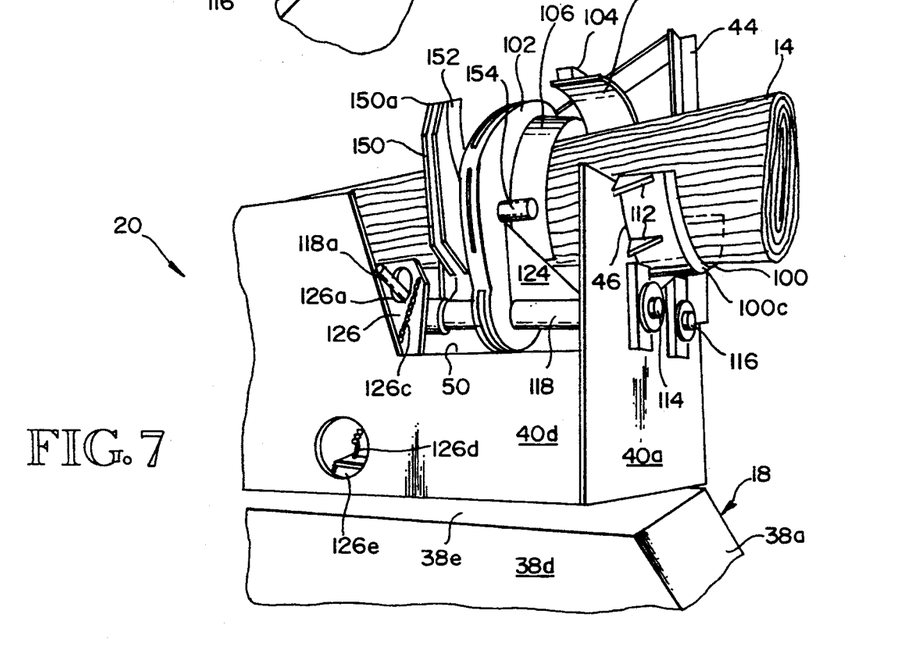
FIG. 7 is a partial view in perspective of the side of the delimber opposite to the side shown in FIG. 2.
Figure 10:
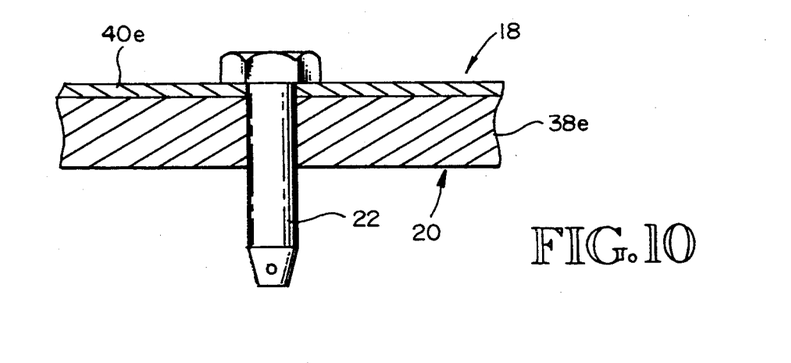
FIG. 10 is a detail view in vertical cross-section showing still another detail of the delimber.

The delimber section 20 comprises a delimber assembly framework fabricated from front, rear, side and bottom steel plates 40a, 40b, 40c, 40d, and 40e, and a delimbing assembly carried by the framework. This framework, in effect, is an open-top turret that is pivotally-mounted to the base section top plate 38e by means of the pivot pin 22 that extends through the turret bottom plate 40e and the base section top plate 38e as shown in FIG. 10, with the two plates 38e and 40e being in face-to-face bearing contact. The plates that make up this framework are rigidly assembled together as by weldments. Side rails 42, 44 are mounted atop the turret plates, as by being attached to the top corners of the front and rear plates 40a, 40b. These side rails provided guides on either side of the opening into the top of the turret for aiding the placement of a tree trunk into the delimber section 20. The front and rear plates 40a, 40b are generally rectangular, but are each formed to provide a semicircular concavity 46, 48 in its upper edge (see FIGS. 3 and 5-7) so as to provide clearance for placement of a tree trunk 14 (see FIGS. 3 and 7). The side plates 40c, 40d are generally rectangular, but are each formed to provide a trapezoidal cutout along its upper edge 50, 52 as shown in FIG. 2, 3, and 7 for a purpose that will become apparent hereinafter. For economy of construction, side plates 40c, 40d are duplicates of one another. The front and rear plates 40a, 40b are provided with two circular shaft apertures that are surrounded with reinforcing bearing blocks 54 (FIGS. 3 and 4). Blocks 54 are secured to the outer faces of the plates by suitable means such as bolts or weldments. The rear plate 40b is provided with two parallel vertical slots 56 (FIGS. 3 and 4). For economy of construction, front and rear plates 40a, 40b are duplicates of one another and, therefore, front plate 40a also is provided with identical parallel vertical slots 56 (FIG. 3). The side plates 40c, 40d are interchangeable and the front and rear plates 40a, 40b are interchangeable. Flanking the inner sides of each slot 56, on the inner face of the rear plate 40b, is a pair of triangular mounting tabs 58 (FIG. 3) suitably secured to plate 40b as by weldments. A steel stiffening bar or tube 60 extends longitudinally between the front and rear plates 40a, 40b and is rigidly secured thereto as by weldments. Bar 60 is positioned just below the bottom of the front and rear plate concavities 46, 48 as shown in FIGS. 3 and 6, and is positioned on the longitudinal center line of the delimbing assembly.

The delimbing assembly is mounted in and carried by the delimber assembly framework described in the preceding paragraph. This assembly comprises a front concave tree trunk cradle 100 that doubles as a stationary delimber knife, a pair of pivotable delimber arms 102, 104 mounting, respectively, concave delimber knifes 106, 108, and a rear tree trunk roller support 110 that doubles as part of a delimber arm actuating mechanism. As thus far described, the delimbing assembly elements are best seen in FIG. 3 but are shown in a number of the other Figures as well.

Figures 8, 9:
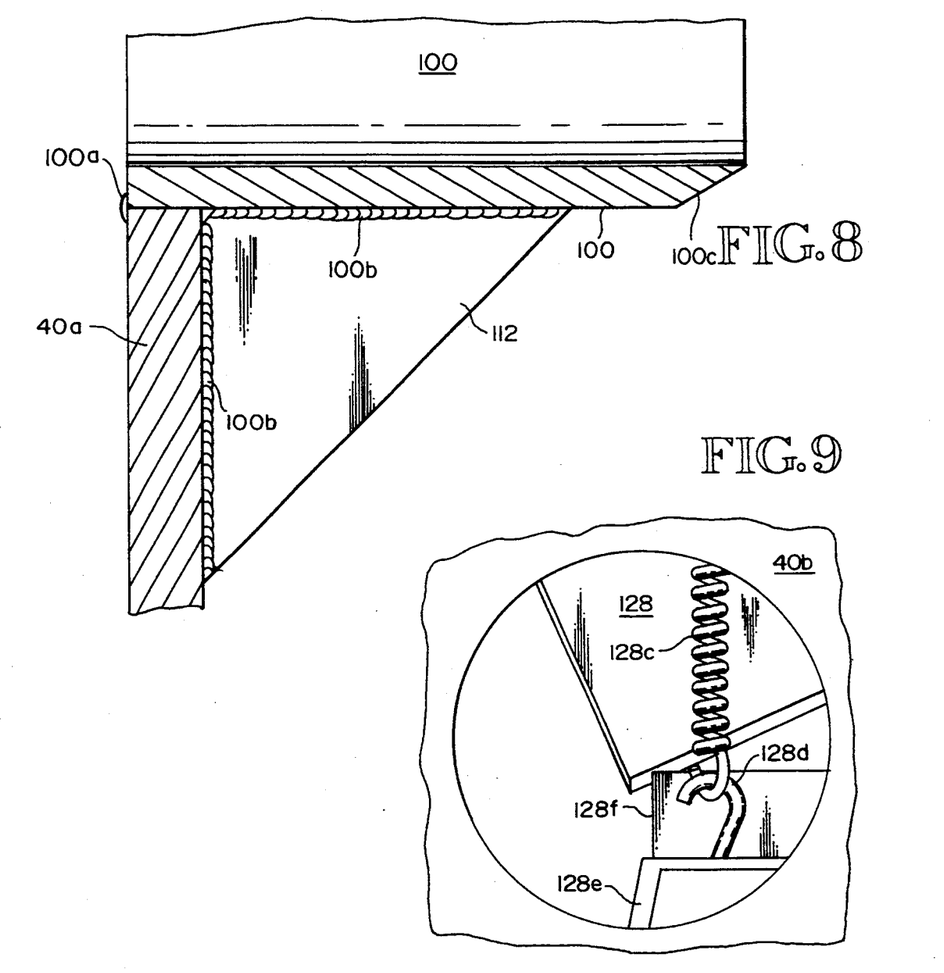
FIG. 8 is a detail view in vertical cross-section taken along the lines 8—8 in FIG. 6.
FIG. 9 is a partial view in vertical elevation showing another detail of the delimbing assembly.

Concave delimber knife 100 is semicircular and mounts within the arcuate concavity 46 in the top edge of the front plate 40a and is securely fastened therein as by weldments as shown in FIG. 8 at 100a. Also as shown in FIG. 8, reinforcing gussets 112 are securely fastened to the outside face of the front plate 40a and to the underside of delimber knife 100 as by weldments as shown at 100b. Several such gussets are provided to insure adequate reinforcement of the delimber knife 100 as shown in FIG. 7. The underside of the leading, or front, edge 100c of delimber knife 100 is beveled upward and outward to provide a knife edge for cutting through tree limbs that are drawn into contact with knife 100 during a delimbing operation. The delimber knife 100 preferably circumscribes an arc of approximately 135°, and has a radius of curvature of approximately 21 inches and a width of about 6 inches.

A pair of steel shafts 114, 116 extend, parallel to one another, longitudinally through the delimber section 20 and through the front and rear plates 40a, 40b (see FIGS. 3, 4 and 7). Each shaft 114, 116 is enclosed by an elongated tubular bushing sleeve 118 and 120, respectively, that extends longitudinally between the front and rear plates 40a, 40b (see FIGS. 3 and 6). The pivotable delimber arms 102, 104 are each securely mounted to one of the bushing sleeves 120, 118, respectively. The axis of each such bushing sleeve constitutes the pivot axis of the respective delimber arm. Each delimber arm 102, 104 is provided with a circular aperture of about the same diameter as the outer diameter of its respective bushing sleeve so that, in fabrication, the delimber arm may be slid over its bushing sleeve and securely fastened thereto as by welding. A reinforcing gusset 122 is securely fastened, as by welding, to the rearward side of teach delimber arm and to its bushing sleeve as shown in FIG. 6. The delimber arms 102, 104 may be fabricated from steel plate into the arcuate configurations shown, with their inner edge surfaces being concave so as to receive their respective concave delimber knives 106, 108. The delimber arm, in side elevation, appear as inverted apostrophes (see FIG. 3) proceeding from a narrow upper tip to a wider bottom end. The bushing aperture is located in the bottom end portion of each delimber arm. The delimber knife for each delimber arm is mounted to its delimber arm above the bushing aperture, and extends from a bottom location approximately vertically above the bushing aperture upward to the upper tip of its delimber arm, as best seen in FIG. 3. The delimber knives 106, 108 are preferably semicircular and circumscribe an arc of approximately 135° have a radius of curvature of approximately 24 inches and a width of approximately 6 inches.

The delimber arms 102, 104 are longitudinally staggered with arm 104 located more rearward and with arm 102 located adjacent the inner side of the front plate 40a as also shown in FIG. 6. The more rearward delimber arm 104 is also provided with a second reinforcing gusset 124 that is securely fastened, as by welding, to the forward side of the arm and to its bushing sleeve 120 as shown in FIG. 7. Being staggered as they are, arms 102, 104 operate in scissor fashion, and their respective delimber knives 106, 108 are securely fastened to their respective arms so that the rearward edge of knife 108 just clears the forward edge of knife 106 as shown in FIG. 7. The outer sides of the leading, or forward, edges of each knife 106, 108 are beveled inwardly and forwardly to provide knife edges for cutting through tree limbs that are drawn into contact with knives 106, 108 during a delimbing operation. The beveled knife edges of knives 106, 108 would be shaped the same as the knife edge of stationary delimber knife 100, and thus would have an appearance in cross-section similar to that shown in FIG. 8 respecting edge 100c of knife 100. The pivot axes of the delimber arms (i.e. the longitudinal axes of the bushing sleeves 118, 120) are preferably approximately 12 inches apart and approximately 12 inches below the upper surface of the stationary delimber knife 100.

Figure 5:
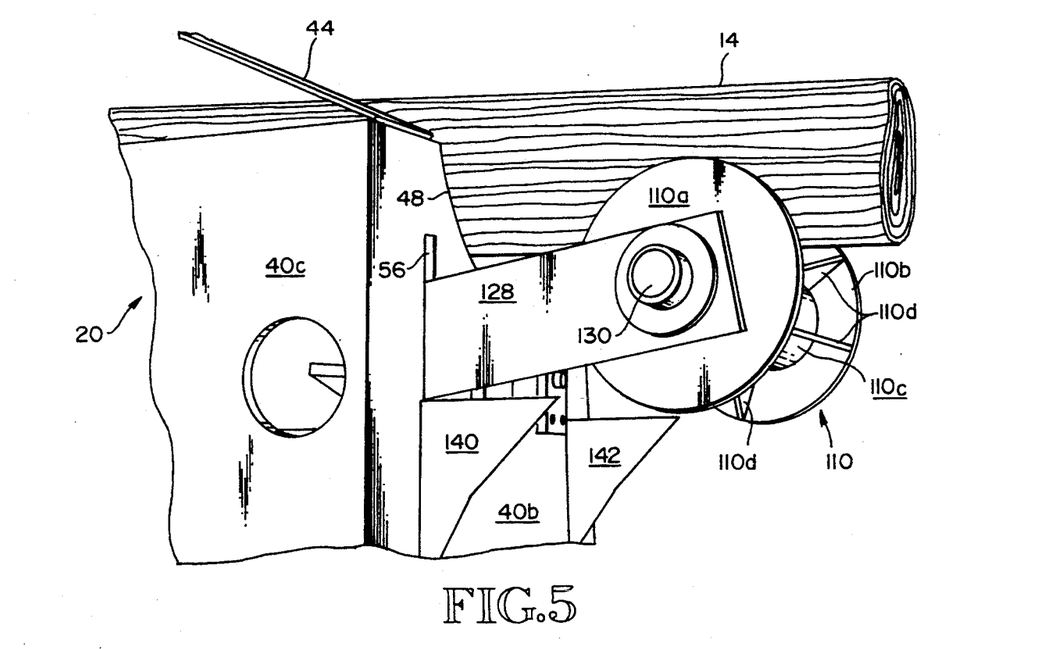
FIG. 5 is a partial view in perspective of the FIG. 4 delimbing exit structure with a tree trunk positioned in the device.

The roller 110 is rotatably-mounted between a pair of lever arms 126, 128 as best seen in FIGS. 3-5. As can be seen in FIGS. 4 and 5, roller 110 is fabricated to provide a pair of circular steel side plates 110a, 110b, fastened to the ends of a steel cylinder 110c as by welding, and a plurality of triangular gussets 110d that are secured to the inner face of one of the side plates and to the cylindrical surface of cylinder 110c as by welding. Gussets 110d taper inward toward the center of cylinder 110c so that roller 110 is self-centering; that is to say, a tree trunk 14 positioned on roller 110 will be centered between the side plates 110a, 110b by the tapered gussets 110d as shown in FIG. 5. A steel shaft 130 extends axially through the side plates 110a, 110b and through the outer ends of the lever arms 126, 128 to rotatably mount roller 110 in the lever arms 126, 128.

Lever arms 126, 128 extend from the roller 110 forwardly through the slots 56 in the rear plate 40b toward the front plate 40a, terminating just before reaching the location of the delimber arms 102, 104 as can be seen in FIG. 3. Each lever arm 126, 128 extends alongside one of the bushing sleeves 118, 120, and is spaced slightly laterally outward therefrom. Each lever arm, 126, 128, extends through one of the pairs of mounting tabs 58 as shown in FIG. 3, and is pivotally mounted thereto by means of a pivot pin 59 that extends through the respective pair of mounting tabs 58. These pivot pins 59 are aligned with one another and define a horizontal lever arm pivot axis 132 as shown in FIG. 3. The forwardmost ends of lever arms 126, 128 are each provided with an elongated, generally vertically-aligned slot, 126a, 128a, and a coil spring attachment rod 126b, 128b (see FIG. 6). Each delimbing arm bushing sleeve 118, 120 is provided with a lever rod 118a, 120a (see FIGS. 3 and 6) that is radially attached to a semicircular bushing collar 118b, 120b. Collars 118b, 120b are welded to the outer circumferences of their respective bushing sleeves 118, 120 such that lever rods 118a, 120a extend radially outward from their respective bushing sleeves and through the elongated slots 126a or 128a as shown in FIGS. 3 and 6. Furthermore, just rearwardly of the location of the bushing collars 118b, 120b, each bushing sleeve 118, 120 is provided with a laterally outward-extending trip bar 118c, 120c. Each trip bar 118c, 120c is welded to its respective bushing sleeve 118, 120 and extends outward far enough to extend across the top edge of the adjacent lever arm 126, 128 as shown in FIG. 3. Each lever arm 126, 128 may be provided with a coil return spring 126c, 128c that extends from the spring rod 126b, 128b downward to a spring anchor hook, anchor hook 128d being illustrated in FIG. 10. The spring anchor hook for each lever arm is mounted to a bracket (bracket 128e being shown in FIG. 10) mounted to and extending upward from the turret bottom plate 40e.

This arrangement of the delimber arm actuating mechanism described in the two preceding paragraphs, comprising roller 110, lever arms 126, 128 with their slots 126a, 128a, bushing rods 118a, 120a and bushing trip bars 118c, 120c, and coil springs 126c, 128c (if present), is designed to function as follows. Commencing with the status of the delimber 10 before a tree trunk 14 is positioned therein, lever arms 126, 128 would be positioned with their forward-most ends down and their rearward-most, roller-mounting ends up; this position being shown in FIGS. 2–4 and 9. The lever arms would be in this orientation either because the weight of the portion of each arm rearward of pivot axis 132 is significantly greater than the combined weight of the portion of each arm forward of pivot axis 132 and the weight of roller 110, or because of the aforementioned weight difference plus the downwardly-pulling spring force exerted by springs 126c, 128c. In either of the alternatives mentioned in the immediately-preceding sentence, the forces that cause the lever arms 126, 128 to attain the orientation shown in FIG. 3 must be great enough to enable the lever arm slots 126a, 128a to engage the bushing rods 118a, 120a and cause the bushing rods to rotate outward and downward to their positions as shown in FIG. 3. This rotation of bushing rods 118a, 120a will cause the bushing sleeves 118, 120 to rotate outwardly so as to cause delimbing arms 102, 104 to rotate outwardly to their wide open positions as shown in FIG. 3. Therefore, the forces that cause the lever arms 126, 128 to attain the orientation shown in FIG. 3 must be great enough to cause the delimbing arms 102, 104 to completely open from a closed position, such as shown in FIGS. 1 and 7, to a completely opened position, such as shown in FIGS. 2–3 and 6.

When a tree trunk is positioned on the delimber, such as is shown in FIG. 1, the trunk 14 will be supported between the front stationary delimber knife 100 (see FIG. 7) and the rear roller 110 (see FIG. 5). As the trunk 14 contacts roller 110 and its weight bears down on roller 110, the weight of the trunk 14 will cause roller 110 to pivot about the pivot axis 132 downward from the unweighted position shown in FIG. 4 to the position shown in FIG. 5. As a consequence of this action, the forward-most ends of lever arms 126, 128, operating in unison, will pivot upward from their positions shown in FIGS. 3 and 6 to the position shown in FIG. 7. As the forward-most ends of lever arms 126, 128 pivot upward about the pivot axis 132, the upper edges of the lever arms will engage the bottom edges of trip bars 118c, 120c and lift the trip bars upward. Trip bars 118c, 120c will consequently pivot upward, thereby causing their bushing sleeves 118, 120 to rotate inward. The inward rotation of bushing sleeves 118, 120 will rotate the delimber arms 104, 106 from their opened positions as seen in FIGS. 3 and 6 to their closed positions shown in FIG. 7. Furthermore, the upward pivoting of the forward-most ends of lever arms 126, 128 will cause the bottom of the slots 126a, 128a in lever arms 126, 128 to contact the bushing sleeve lever rods 118a, 120a as seen in FIG. 7 with respect to lever rod 120a. As the forward-most ends of lever arms 126, 128 continue to pivot upward, the bottom of slots 126a, 128a will bear against the lever rods 118, 129a with sufficient force to force the bushing sleeves 118, 120 to rotate inward. Consequently, the further pivoting upward of the forward-most ends of lever arms 126, 128 will cause the delimber arms 104, 106 to rotate inward against the trunk 14, with the closing force exerted through lever rods 118a, 120a continuing throughout the rest of the delimbing operation. Thus, as the grapple loader 16 pulls the tree through the delimber 10, the delimber knives 106, 108 will be urged into close proximity to the trunk 14 so that the limbs are sheared off close to the trunk as the tree is pulled through the delimber. The axes of rotation of the delimber arms are offset from the center of the trunk alignment inasmuch as the longitudinal axes of the bushing sleeves 118, 120 are spaced outward from the longitudinal axis of the brace member 60 (see FIG. 3). When the delimber arms 118, 120 are closed on a trunk, therefore, the centers of mass of the delimber arms will be positioned vertically inward of the delimber arm rotation axes thereby exerting inwardly eccentric forces tending to further rotate the delimber arms toward the trunk. The combined forces (1) of the lever arms, exerting an upward force to cause the bushing sleeves to rotate inward due to the weight of the trunk on the roller 110, and (2) of the closed delimber arms, exerting inwardly eccentric downward forces to also cause the bushing sleeves to rotate inward due to the center of masses of the delimber arms being inward of the delimber axes of rotation, will insure that delimber knives 106, 108 will remain properly positioned for the rest of the delimbing operation.

When the tree is stripped through the delimber 10 and is free from the delimber, the delimber knives 106, 108 might tend to fall completely closed unless otherwise restrained. Stop plates 140, 142 are attached as bumpers to the rear plate 40b just underneath the lever arm slots 56, 58 (see FIG. 5). When the tree is removed from the delimber 10, if the sudden release of the weight of the delimber arms 102, 104 would tend to cause the delimber arms to collapse completely inward, the resultant continued upward pivoting of the lever arms 126, 128 will cause the rearward-most ends of the lever arms to contact the upper edges of the stop plates 140, 142 and arrest any further pivoting of the lever arms. After the shock of the tree removal for the delimber 10, the weight of the lever arms forward of the pivot axis 132, plus the force of the return springs 126c, 128c (if the springs are present), will cause the forward-most ends of the lever arms 126, 128 (i.e. the ends forward of pivot axis 132) to pivot back downward. This downward movement of the forward-most ends of the lever arms, will bring the upper ends of the slots 126a, 128a down against the lever rods 118a, 120a and cause the lever rods to move downwardly, thereby causing the bushing sleeves 118, 120 to rotate outward so as to pivot the delimbing arms 102, 104 upward and outward to their opened position (the position shown in FIG. 3).

In order to insure that the delimber arms 102, 104 do not open too wide, stops are provided adjacent the lower spring hooks 126d, 128d (stop 128f being shown in FIG. 9) to limit the extent of downward movement of the forward-most ends of the lever arms 126, 128. As thus limited, the arrangement of the interactive elements of the delimber arm actuating mechanism is such that trip bars 118c, 120c would contact the upper edges of the lever arms 102, 104 at the limit of this downward movement. Therefore, if the delimber arms 102,104 would tend to continue to open when the forward-most ends of the lever arms reached their downward limit, the delimber arms would be blocked by the contact of the trip bars with the lever arms.

Cutouts 50, 52 in the delimber section side plates 40c, 40d are provided to insure that the delimber arms may open as widely as the lever arm stops (e.g. 128f) will allow without contacting or binding against the side plates. This can be seen in FIGS. 2, 3 and 6. As a consequence of these cutouts in the side plates, the overall width of the delimber section 20 may be reduced from that which would otherwise be required. The delimber assembly is preferably designed to accommodate trunk diameters from about 6–8 inches up to 16–18 inches. In order to accommodate the larger-sized trunks, the radius of curvature of the delimber arm knives 106, 108 needs to be somewhat greater than the largest trunk size for which the device is designed to handle.

For the smaller-sized trunks, however, these larger-radiused delimber arm knives 106, 108 may not encircle the upper portion a tree trunk closely enough to sever the limbs on that upper portion as close to the trunk as would be desired. For example, with reference to FIG. 6, with a small diameter trunk the overlapping delimber arm knives 106, 108 would cross over the upper portion of the trunk 14 several inches above the trunk. In order to provide for shearing limbs off the upper portions of smaller tree trunks, a auxiliary delimber arm 150 and knife 152 is provided on the rearward side of one of the delimber arms (such as delimber arm 102 as shown in FIGS. 6 and 7). Knife 152 is semicircular with a radius of curvature of preferably about 12 inches and with a forward edge configured in the same manner as shown in FIG. 8 with respect to knife 100. This auxiliary delimber arm 150 is pivotally mounted to delimber arm 102 by means of a stub cross-shaft 154. Cross shaft 154 extends through delimber arm 102 about mid-length between its point of rotation on bushing sleeve 118 and it outer tip end as shown in FIGS. 3 and 7. Cross shaft 154 extends through or into auxiliary delimber arm 150 at about its mid-length so that auxiliary delimber arm 150 will pivot about the axis of cross shaft 154. The bottom end 150a of auxiliary delimber arm 150 (see FIG. 6) is free to pivot into and out of abutment with the outer side of reinforcing gusset 122. As a result of this construction, when delimber arm 102 is pivoted over a small diameter trunk, the cross shaft 154 will be swung upward and over the trunk, beyond the point shown in FIG. 7, so that the auxiliary arm 150 will pivot about cross shaft 154 so that the outer tip end 150b will fall inward over and onto the trunk. In this position, the upper limbs will be closely sheared off by the auxiliary delimber knife 152. When the delimbing operation is concluded, delimber arm 102 will be pivoted back toward its open position and will carry cross shaft 154 back toward and beyond the position shown in FIG. 7. When cross shaft 154 reaches a certain position, approximately about that shown in FIG. 7, the mass of auxiliary delimber arm 150 about its pivot point will lie outward of cross shaft 154 and, consequently, delimber arm 150 will pivot about cross shaft 154 outward—away from a delimbing position—to the position shown in FIG. 7. The auxiliary delimber arm 150 is prevented from "flopping" so far outward as to interfere with the operation of the delimber assembly because its bottom end 150a comes into contact with the gusset 122 (see FIG. 6). Thus, delimber arm 150 is retained in the position shown in FIG. 7 relative to delimber arm 102. Therefore, the auxiliary delimber arm 150 only comes into play when a small enough trunk permits delimber arm 102 to pivot far enough over the small trunk so as to enable the "top heavy" auxiliary delimber arm "flop" about its pivot axis (i.e. the longitudinal axis of cross shaft 154) over and onto the top of the small trunk.

While the preferred embodiment of the invention has been described herein, variations in the design may be made. The scope of the invention, therefore, is only to be limited by the claims appended hereto.

The embodiments of the invention in which an exclusive property is claimed are defined as follows:

In the claims:

1. A pull-through delimber apparatus for delimbing a felled tree which comprises:

a delimber section providing a mounting means for a delimbing assembly and adapted to have a tree trunk loaded into said delimbing assembly and to support the tree trunk in a position whereby the tree trunk may be pulled through said delimbing assembly for delimbing;

said delimbing assembly being mounted by said delimber section and comprising a first trunk supporting means for receiving and supporting a portion of a tree trunk, second trunk supporting means for receiving and supporting a second portion of a tree trunk, and delimber means mounted between said first and second trunk supporting means for removing limbs from the tree trunk as the tree trunk is pulled through said delimbing assembly;

said delimber means comprising first and second delimber arm means mounted to pivot inward to a tree trunk delimbing position and to pivot outward to a tree trunk loading position, and delimber arm actuating means; said first delimber arm means including first delimber knife means for contacting and cutting limbs off a tree trunk when said first delimber arm means is positioned in the tree trunk delimbing position; said second delimber arm means including second delimber knife means for contacting and cutting limbs off a tree trunk when said second delimber arm means is positioned in the tree trunk delimbing position; and said delimber arm actuating means connecting said first and second delimber arms with said second trunk supporting means, said delimber arm actuating means being so constructed and arranged such that said first and second delimber arm means are normally positioned outward to said tree trunk loading position, and such that the weight of a tree trunk supported by said second trunk supporting means will cause said first and second delimber arm means to pivot inward to said tree trunk delimbing position, whereby said first and second delimber knife means will be automatically positioned for cutting limbs off a tree trunk as a result of the tree trunk being loaded into said delimbing assembly.

2. The delimber apparatus of claim 1 wherein said delimber arm actuating means comprises lever arm means pivotally connected to said delimber section, said lever arm means mounting said second trunk supporting means, said lever arm means pivotally coupling said second trunk supporting means to said first and second delimber arm means whereby the weight of the tree trunk on said roller means will cause said roller means to pivot downward and thereby to effect movement of said first and second delimber arm means to the tree trunk delimbing position.

3. The delimber apparatus of claim 1 wherein said first trunk supporting means comprises a third delimber knife means, said third delimber knife means comprising a stationary upwardly opening concave knife member attached to said delimber section for delimbing the bottom portion of a tree trunk supported in said delimber section; and wherein said first and second delimber arms are located in staggered relationship to one another and rearwardly of said third delimber knife means, said first and second delimber arms being so constructed and arranged to position said first and second knife means for delimbing opposite side and upper portions of said tree trunk when in the tree trunk delimbing position.

4. The delimber apparatus of claim 3 wherein said second trunk supporting means comprises roller means adapted to receive and support the trunk of a tree loaded into said delimbing assembly; and wherein said delimber arm actuating means comprises lever arm means pivotally connected to said delimber section, said lever arm means rotatably mounting said roller means for rotation about an axis transverse to the tree trunk, and said lever arm means pivotally coupling said roller means to said first and second delimber arm means whereby the weight of the tree trunk on said roller means will cause said roller means to pivot downward and thereby to effect movement of said first and second delimber arm means to the tree trunk delimbing position.

5. The delimber apparatus of claim 1 wherein said delimber means comprises elongated shaft means rotatably mounted to said delimber section; and wherein said first and second delimber arm means are pivotally mounted by said shaft means to pivot from opposite sides of said delimber section between said tree trunk loading position and said tree trunk delimbing position.

6. The delimber apparatus of claim 5 wherein said delimber arm actuating means comprises lever arm means pivotally connected to said delimber section, said lever arm means mounting said second trunk supporting means, and said lever arm means pivotally coupling said second trunk supporting means to said shaft means whereby the weight of the tree trunk on said second trunk supporting means will cause said second trunk supporting means to pivot downward and said shaft means to rotate, and thereby to effect pivotal movement of said first and second delimber arm means from said tree trunk loading position to said tree trunk delimbing position.

7. The delimber apparatus of claim 5 wherein said first trunk supporting means comprises a third delimber knife means, said third delimber knife means comprising a stationary upwardly opening concave knife member attached to said delimber section for delimbing the bottom portion of a tree trunk supported in said delimber section; and wherein said first and second delimber arms are located in staggered relationship to one another and rearwardly of said third delimber knife means, said first and second delimber arms being so constructed and arranged to position said first and second knife means for delimbing opposite side and upper portions of said tree trunk when in the tree trunk delimbing position.

8. The delimber apparatus of claim 5 wherein said delimber arm actuating means comprises lever arm means pivotally connected to said delimber section, said lever arm means mounting said second trunk supporting means, and said lever arm means pivotally coupling said second trunk supporting means to said shaft means whereby the weight of the tree trunk on said second trunk supporting means will cause said second trunk supporting means to pivot downward and said shaft means to rotate, and thereby to effect pivotal movement of said first and second delimber arm means from said tree trunk loading position to said tree trunk delimbing position; wherein said first trunk supporting means comprises a third delimber knife means, said third delimber knife means comprising a stationary upwardly opening concave knife member attached to said delimber section for delimbing the bottom portion of a tree trunk supported in said delimber section; and wherein said first and second delimber arms are located in staggered relationship to one another and rearwardly of said third delimber knife means, said first and second delimber arms being so constructed and arranged to position said first and second knife means for delimbing opposite side and upper portions of said tree trunk when in the tree trunk delimbing position.

9. The delimber apparatus of claim 8 wherein said second trunk supporting means comprises roller means adapted to receive and support the trunk of a tree loaded into said delimbing assembly; and wherein the lever arm means of said delimber arm actuating means rotatably mounts said roller means for rotation about an axis transverse to the tree trunk, and said lever arm means pivotally couples said roller means to said first and second delimber arm means whereby the weight of the tree trunk on said roller means will cause said roller means to pivot downward and thereby to effect movement of said first and second delimber arm means to the tree trunk delimbing position.

10. The delimber apparatus of claim 1 wherein said delimber means comprises a first and second elongated shaft means rotatably mounted to said delimber section; and wherein said first delimber arm means is pivotally mounted by said first shaft means and said second delimber arm means is pivotally mounted by said second shaft means such that said first and second delimber arm means pivot from opposite sides of said delimber section between said tree trunk loading position and said tree trunk delimbing position;

wherein said second trunk supporting means comprises roller means adapted to receive and support the trunk of a tree loaded into said delimbing assembly; and wherein said delimber arm actuating means comprises first and second levers pivotally connected to said delimber section, said first and second levers having respective forward and rearward ends, the rearward ends of said first and second levers rotatably mounting said roller means for rotation about an axis transverse to the tree trunk, and the forward ends of said first and second levers being coupled to said first and second shaft means whereby the weight of the tree trunk on said roller means will cause said roller means to pivot downward and said first and second shaft means to rotate and thereby to effect movement of said first and second delimber arm means from the tree trunk loading position to the tree trunk delimbing position.

11. The delimber apparatus of claim 10 wherein said first trunk supporting means comprises a third delimber knife means, said third delimber knife means comprising a stationary upwardly opening concave knife member attached to said delimber section for delimbing the bottom portion of a tree trunk supported in said delimber section; and wherein said first and second delimber arms are located in staggered relationship to one another and rearwardly of said third delimber knife means, said first and second delimber arms being so constructed and arranged to position said first and second knife means for delimbing opposite side and upper portions of said tree trunk when in the tree trunk delimbing position.

12. A pull-through delimber apparatus for delimbing a felled tree which comprises:

a) a delimber section providing a mounting means for a delimbing assembly and adapted to have a tree trunk loaded into said delimbing assembly and to support the tree trunk in a position whereby the tree trunk may be pulled through said delimbing assembly for delimbing; a base section providing a stable platform for said delimber section, said base section comprising a ground-engaging framework, a base attached to the framework providing an elevated turntable for said delimber section; and means pivotally mounting said delimber section to said turntable for rotation about a vertical axis; said delimbing assembly being mounted by said delimber section and comprising a first trunk supporting means for receiving and supporting a portion of a tree trunk, second trunk supporting means for receiving and supporting a second portion of a tree trunk, and delimber means mounted between said first and second trunk supporting means for removing limbs from the tree trunk as the tree trunk is pulled through said delimbing assembly;

a) said first trunk supporting means comprising a stationary upwardly opening concave knife member attached to said delimber section for delimbing the bottom portion of a tree trunk supported in said delimber section;

b) said second trunk supporting means comprising roller means adapted to receive and support the trunk of a tree loaded into said delimbing assembly; and c) said delimber means comprising first and second delimber arm means mounted to pivot inward to a tree trunk delimbing position and to pivot outward to a tree trunk loading position, and delimber arm actuating means;

i) said first delimber arm means including first delimber knife means for contacting and cutting limbs off a tree trunk when said first delimber arm means is positioned in the tree trunk delimbing position; and said second delimber arm means including second delimber knife means for contacting and cutting limbs off a tree trunk when said second delimber arm means is positioned in the tree trunk delimbing position; said first and second delimber arms being located in staggered relationship to one another and rearwardly of said concave knife member, said first and second delimber arms being so constructed and arranged to position said first and second knife means for delimbing opposite side and upper portions of said tree trunk when in the tree trunk delimbing position;

ii) said delimber arm actuating means comprising lever arm means pivotally connected to said delimber section, said lever arm means rotatably mounting said roller means for rotation about an axis transverse to the tree trunk, said lever arm means being so constructed and arranged such that said first and second delimber arm means are normally positioned outward to said tree trunk loading position, and such that the weight of a tree trunk supported by said roller means will cause said first and second delimber arm means to pivot inward to said tree trunk delimbing position, whereby said first and second delimber knife means will be automatically positioned for cutting limbs off a tree trunk as a result of the tree trunk being loaded into said delimbing assembly.

13. The delimber apparatus of claim 12 wherein said delimber means comprises a first and second elongated shaft means rotatably mounted to said delimber section; and wherein said first delimber arm means is pivotally mounted by said first shaft means and said second delimber arm means is pivotally mounted by said second shaft means such that said first and second delimber arm means pivot from opposite sides of said delimber section between said tree trunk loading position and said tree trunk delimbing position; and wherein said delimber arm actuating means comprises first and second levers pivotally connected to said delimber section, said first and second levers having respective forward and rearward ends, the rearward ends of said first and second levers rotatably mounting said roller means for rotation about an axis transverse to the tree trunk, and the forward ends of said first and second levers being coupled to said first and second shaft means whereby the weight of the tree trunk on said roller means will cause said roller means to pivot downward and said first and second shaft means to rotate and thereby to effect movement of said first and second delimber arm means from the tree trunk loading position to the tree trunk delimbing position.

14. The delimber apparatus of claim 13 wherein said delimber means includes an auxiliary delimber arm means pivotally mounted to one of said first and second delimber arms and an auxiliary knife means for delimbing the top portion of a small diameter tree trunk, said auxiliary delimber arm means being so constructed and arranged with respect to its pivotal mounting that said auxiliary knife means will be pivoted by gravity over and onto the top portion of a small diameter log when said first and second delimber arm means are positioned in their tree trunk delimbing position.

* * * * *